(12) United States Patent
Celestina-Krevh et al.

(10) Patent No.: US 6,454,350 B1
(45) Date of Patent: Sep. 24, 2002

(54) INFANT CAR SEAT/CARRIER ASSEMBLY AND METHOD OF CONTROLLING AN INFANT CARRIER POSITION

(75) Inventors: Mary Ann Celestina-Krevh, Euclid; Michael Carnahan, Bedford; LeNard Pope, Cleveland, all of OH (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 09/421,411

(22) Filed: Oct. 21, 1999

Related U.S. Application Data
(60) Provisional application No. 60/136,237, filed on May 26, 1999.

(51) Int. Cl.$^7$ ................................................. B60N 2/28
(52) U.S. Cl. .......................... 297/216.11; 297/216.19; 297/256.16; 297/256.13
(58) Field of Search ...................... 297/216.11, 216.19, 297/256.13, 256.16

(56) References Cited

U.S. PATENT DOCUMENTS

| | | | |
|---|---|---|---|
| 3,052,500 A | 9/1962 | Hyde ........................ 297/130 |
| 3,357,736 A | 12/1967 | McCarthy .................... 296/65 |
| 4,047,755 A | 9/1977 | McDonald et al. |
| 4,231,612 A | 11/1980 | Meeker |
| 4,634,175 A | 1/1987 | Wise ........................ 297/183 |
| 4,634,177 A | 1/1987 | Meeker |
| 4,733,909 A | 3/1988 | Single, II et al. |
| 4,804,230 A | 2/1989 | Friedman |
| 4,936,629 A | 6/1990 | Young |
| 4,971,392 A | 11/1990 | Young |
| 5,052,750 A | 10/1991 | Takahashi et al. |
| 5,058,283 A | 10/1991 | Wise et al. |
| 5,110,182 A | 5/1992 | Beauvais ................ 297/216.11 |
| 5,181,761 A | 1/1993 | Meeker |
| 5,236,221 A | * 8/1993 | Minami .................. 297/256.13 |
| 5,277,472 A | 1/1994 | Freese et al. |
| 5,335,964 A | 8/1994 | Sedlack et al. ........ 297/256.13 |
| 5,340,185 A | 8/1994 | Vollmer ..................... 296/68.1 |
| 5,380,062 A | 1/1995 | Nania ..................... 297/256.13 |
| 5,385,387 A | 1/1995 | Kain ...................... 297/256.16 |
| 5,551,751 A | 9/1996 | Sedlack et al. ........ 297/256.13 |
| 5,609,393 A | 3/1997 | Meeker et al. ......... 297/256.13 |
| 5,664,830 A | 9/1997 | Garcia et al. .......... 297/216.11 |
| 5,722,719 A | 3/1998 | Glomstad .............. 297/216.11 |
| 5,772,279 A | 6/1998 | Johnson, Jr. ................ 297/130 |
| 5,836,650 A | 11/1998 | Warner, Jr. et al. ..... 297/256.11 |
| 5,997,086 A | 12/1999 | Gibson et al. ......... 297/256.16 |

FOREIGN PATENT DOCUMENTS

| | | | | |
|---|---|---|---|---|
| DE | 4236198 | * | 4/1994 | ............ 297/216.11 |
| FR | 2 596 338 | | 10/1987 | ............ 297/216.19 |

\* cited by examiner

*Primary Examiner*—Peter R. Brown
(74) *Attorney, Agent, or Firm*—Foley & Lardner

(57) ABSTRACT

An infant carrier assembly and a method controlling an infant carrier position use a base and a movable trolley mounted to a vehicle in a rearwardly facing direction. An infant carrier is detachably mounted to the trolley. The trolley is movable so that the carrier is movable between two reclined positions, 58° and 49° from the vertical to the infant carrier seatback. A sacrificial link and springs connect the trolley to the base to limit the movement between the two positions. During a front collision, e.g., when 1 or more G-force is created, the sacrificial link breaks away to release the trolley/carrier from the reclined positions to an upright position, where the carrier seatback can be upright up to about 15% (14°) from the vertical.

22 Claims, 12 Drawing Sheets

CARRIER AND TROLLEY IN MOST RECLINED POSITION

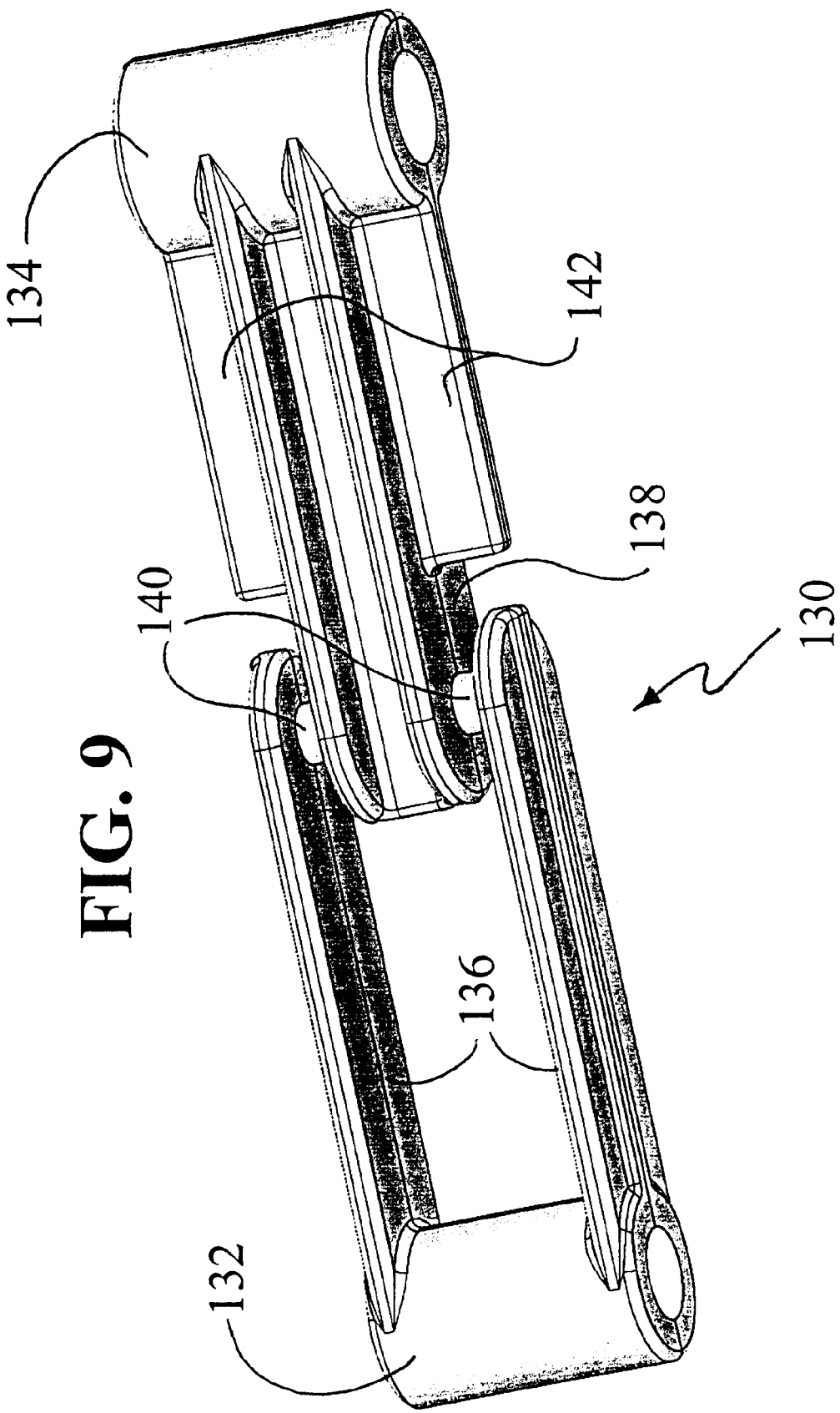

INFANT CAR SEAT/CARRIER ASSEMBLY AND METHOD OF CONTROLLING AN INFANT CARRIER POSITION

This application claims the benefit of U.S. Provisional Application Ser. No. 60/136,237, filed May 26, 1999, the disclosure of which is hereby incorporated by reference.

BACKGROUND

For safety reasons, an infant or a young child riding in an automobile needs to be in a safety restraint. It has been found that infant seats oriented in an upright and rearwardly facing direction provide better crash protection than in a reclined orientation. When the infant is upright, forces can be better distributed across an infant's back and shoulders. By comparison, when the infant is oriented in a reclined position, crash forces tend to distribute over the infant's more vulnerable head and neck area.

For this reason, the U.S. National Highway Traffic Safety Administration (NHTSA) forbade use of reclined carriers in cars/vehicles. But with the advent of the SMART MOVE carrier, which is disclosed in U.S. Pat. No. 5,551,751 issued to Sedlack, et al., NHTSA now allows an infant to be carried in a reclined position, if a provision is made to uprightly orient the infant in a crash. The SMART MOVE carrier and the carrier described in U.S. Pat. No. 5,722,719, issued to Glomstadt, are infant carriers that can be secured to a carseat in a rearwardly facing direction. These carriers have provisions for uprighting an infant's body position during a collision.

Specifically, these carriers have a base that is mounted to the car seat and an infant seat movably mounted to the base. The infant seat is movable so that, during a collision, the infant seat can swivel or rotate to an upright position. Because movable parts and shock reducing elements are part of the carrier, it can be somewhat bulky to carry.

Thus, there is a need for the carrier to be more transportable and easier to mount to a car seat in a rearwardly facing direction, while providing the safety features mandated by NHTSA. The present invention can meet this need.

SUMMARY

The present invention relates to a base assembly and an infant carrier assembly having an infant carrier that is normally mounted in a rearwardly facing direction, and a method of controlling the carrier position. The infant carrier assembly has a base that can be attached to a car seat, a trolley that is movably attached to the base, and a carrier that is detachably connectable to the trolley. The trolley is adjustably mounted relative to the base so that it, with the mounted carrier, can be at various reclined positions. During a front collision, the trolley can break away from the reclined positions to uprightly position the carrier and soften the impact.

The infant carrier assembly comprises a base assembly and an infant carrier. The base assembly includes a base, a trolley, and a linkage assembly. The base is adapted to be secured to a vehicle seat. The trolley is movably mounted to the base and is limited to move between a first reclined position and a second reclined position, which is less reclined than the first reclined position. The linkage assembly connects the trolley to the base and limits the trolley to move between the first and second reclined positions. The infant carrier is detachably mountable to the trolley in a rearwardly facing direction relative to the vehicle seat.

The linkage assembly has a sacrificial link that can break when a predetermined force is applied to the trolley in a forward direction of the vehicle, whereupon the trolley is forced out of the first and second reclined position to an upright position. In the first reclined position, the carrier (its seatback) is angled about 58° from the vertical and in the second reclined position, the carrier (its seatback) is angled about 49° degrees from the vertical. The carrier (its seatback) can be angled upright up to about 15% (, i.e., greater than about 14°) from the vertical when the carrier is in the upright position.

The base can include a tilting mechanism that tilts the trolley relative to the vehicle seat. In this respect, the base comprises a foot, a lower base, and an upper base. The lower base is tiltably connected to the foot and the upper base is fixedly attached to the lower base. Specifically, the tilting mechanism can comprise an actuator, a first height adjusting tower, and a height adjusting rod. The actuator is movably mounted to the base and engages the height adjusting rod. The height adjusting tower is fixedly connected to the foot and has a plurality of rod receiving slots. The height adjusting rod is movably mounted to the lower base so that the actuator can move the height adjusting rod out of the respective slot, which allows the lower and upper bases to tilt relative to the foot.

The tilting mechanism can further include a second height adjusting tower spaced apart from the first height adjusting tower. The first and second height adjusting towers receive opposite ends of the height adjusting rod. The actuator has a slot that receives the height adjusting rod, between the ends thereof.

The base can have a front rail and a rear rail. The trolley can carry a front recline rod and a rear recline rod, the front rail receiving and guiding the front recline rod and the rear rail receiving and guiding the rear recline rod so that the trolley is movable relative to the base along the front and rear rails.

The linkage assembly can include a recline adjusting rod latchable to the base. The sacrificial link couples the rear recline rod, which is connected to the trolley, to the recline adjusting rod, which is latchable to the base. The linkage assembly further includes at least one spring coupling the recline adjusting rod to the rear recline rod, the spring becoming active when the sacrificial link breaks. Preferably, at least a pair of springs couple the rods.

The base can have first and second recesses that receive the recline adjusting rod. The trolley is locked in the first reclined position when the recline adjusting rod is seated in the first recess and locked in the second reclined position when the recline adjusting rod is seated in the second recess. A recline actuator is movably, e.g., pivotally, mounted to the base and has a first engaging member that engages the recline adjusting rod. The recline actuator moves the recline adjusting rod away from one of the first and second recesses to release the trolley, upon which the trolley is movable to the other of the first and second recesses. The recline actuator can include a second engaging member laterally spaced apart from the first engaging member.

The sacrificial link can comprise a first member pivotally connected to the recline adjusting rod and a second member pivotally connected to the rear recline rod to the recline adjusting rod, and a breakable member connecting the first and second members. The first member can comprise a first bushing pivotally journalled about the recline adjusting rod and a first pair of spaced apart linking arms extending from the first bushing. The second member can comprise a second bushing pivotally journalled about the rear recline rod and a second linking arm extending from the second bushing. The breakable member can connect free ends of the first and second linking arms.

A carrier latch assembly can be used to detachably mount the carrier to the trolley. The carrier latch assembly can comprise a pair of opposing slots formed at the carrier, a latch actuator, and first and second spring-biased latch plungers movably mounted to the trolley and movable into the opposing slots. The latch actuator is operably connected to the latch plungers to withdraw the plungers from the opposing slots to detach the carrier from the trolley. In this respect, the latch actuator can use a pair of mirror-imaged diagonal slots. Each latch plungers can have a pin extending therefrom and guided in one of the diagonal slots, which are configured to move the pins toward each other when the latch actuator is pulled.

A method of controlling an infant carrier position in a vehicle comprises: providing a base, which is adapted to be secured to a vehicle seat; mounting a trolley to the base and limiting the trolley between a first reclined position and a second reclined position, which is more upright than the first reclined position, relative to the base; detachably mounting an infant carrier to the trolley in a rearwardly facing direction relative to the vehicle seat; and breaking the trolley out of the first or second reclined position to an upright position when a predetermined force is applied to the carrier in a forward direction of the vehicle.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

FIG. 9 is a detailed perspective view of a sacrificial link.

DETAILED DESCRIPTION

References are made to directions in describing the structure. The directions, however, are made relative to the drawings (as normally viewed) for convenience. The directions, such as left, right, upper, lower, etc., are not intended to be taken literally or limit the present invention in any form.

Figure 10:
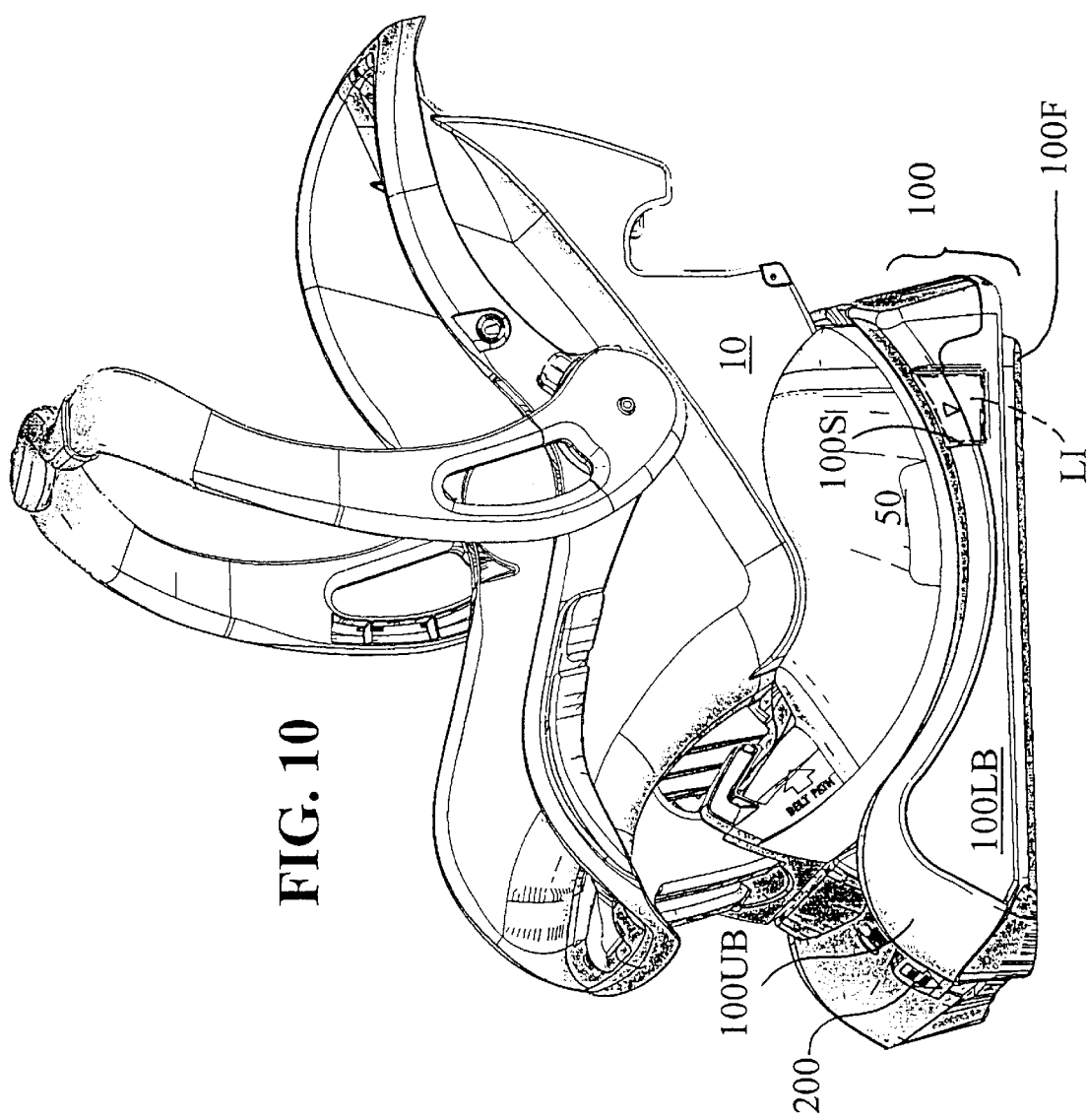
FIG. 10 is a perspective view of an infant carrier assembly according to the present invention.

Referring to FIG. 10, the present infant carrier/car seat assembly (hereafter carrier assembly) comprises a carrier 10, a trolley 50, and a base 100. The carrier 10 is releasably mounted to the trolley 50 so that the carrier can be removed and carried, without the base 100 or the trolley 50. The trolley 50 is adjustably mounted to the base 100 so that the carrier 10 attached thereto can be oriented in either a most reclined position (FIG. 2) or a reclined position (FIG. 3), which is less reclined than the most reclined position. The trolley/base (hereafter base assembly) 50, 100 is adapted to be mounted to the car seat using a conventional carseat belt.

Figure 1:
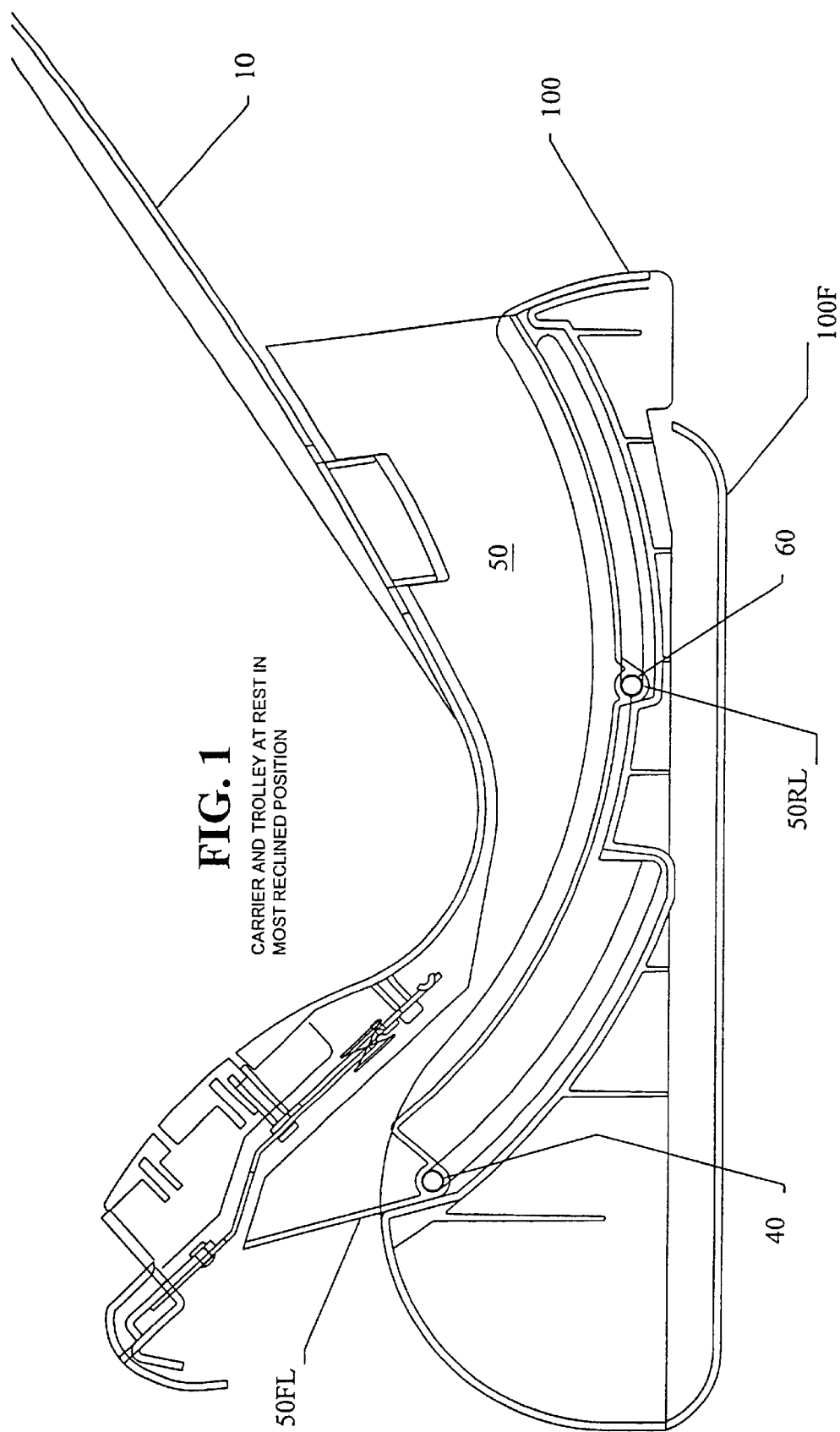
FIG. 1 is a schematic cutaway side view of an infant carrier assembly according to the invention, illustrating an infant carrier and a trolley at rest, and a base.
Figure 2:
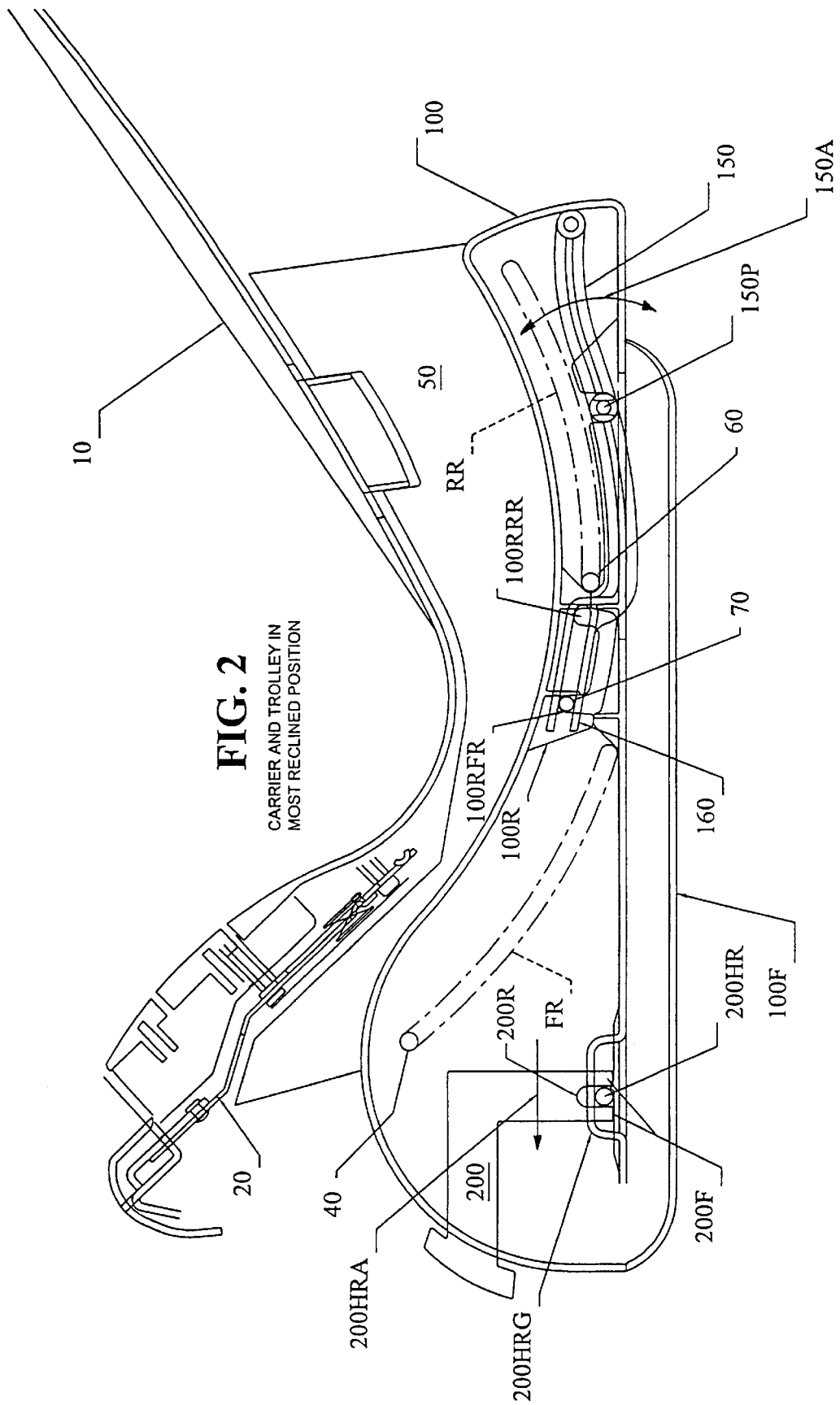
FIG. 2 is a view similar to FIG. 1, illustrating the carrier and the trolley in a most reclined position.
Figure 3:
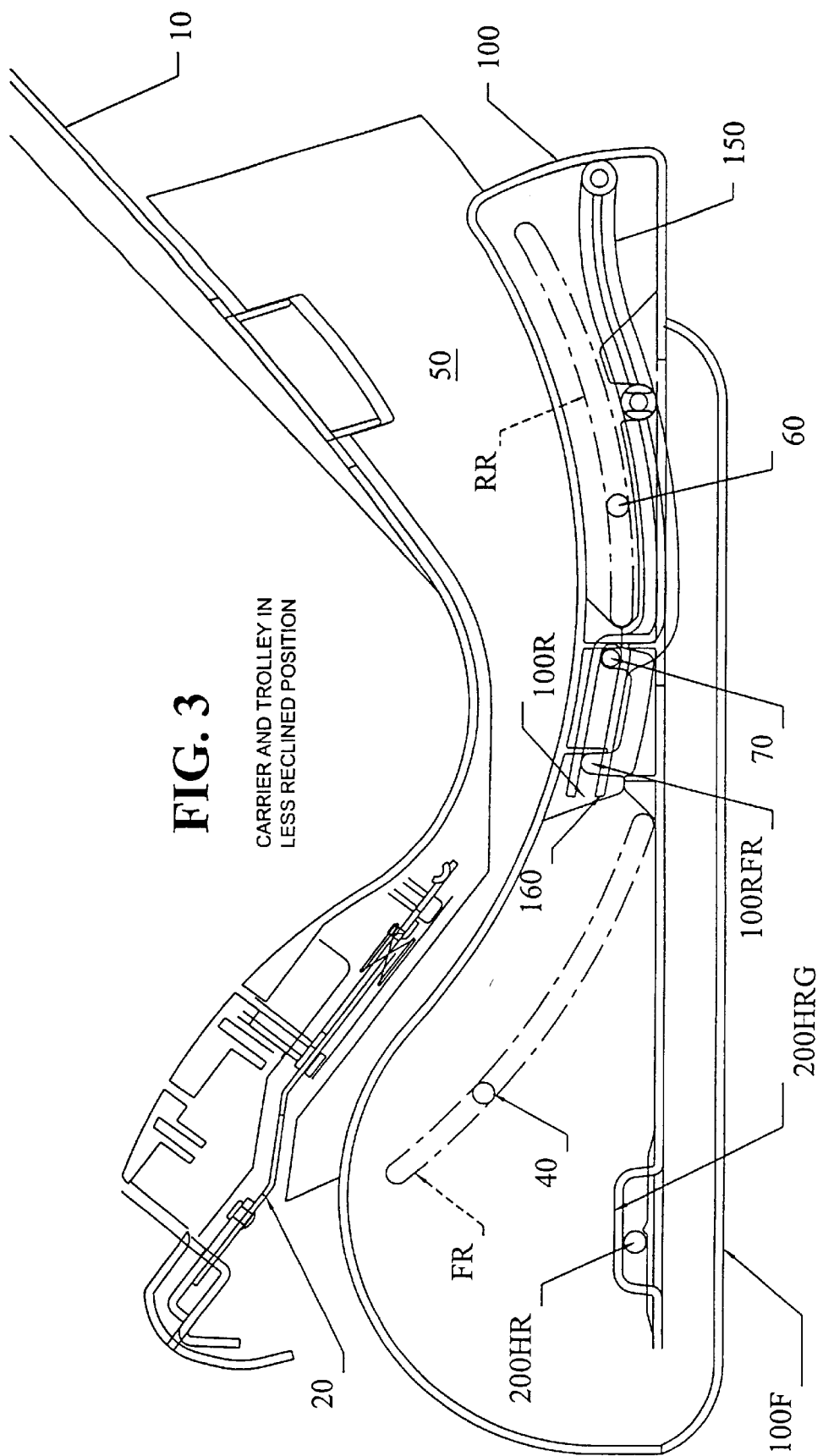
FIG. 3 is a view similar to FIG. 2, illustrating the carrier and the trolley in a reclined, but less reclined position.

Referring to FIGS. 2 and 3, the trolley 50 is positioned in one of two definitive reclined positions, either a most reclined or reclined position. The trolley 50 is locked to one of these two positions during use. The base 100 can have a pair of laterally spaced apart front rails FR and a pair of laterally spaced apart rear rails RR. See also FIGS. 1 and 12. The front and rear rails FR, RR are spaced apart from each other in the fore and aft direction. The trolley 50 carries a front recline rod 40 slideably guided in the front rail FR and a rear recline rod 60 slideably guided in the rear rail RR. The front and rear recline rods 40, 60 can be mounted parallel to the trolley 50 as shown in FIGS. 1–3. In this respect, the trolley 50 can have a pair of spaced apart front legs 50FL and a pair of spaced apart rear legs 50RL depending from its underside. Each of the front and rear legs 50FL, 50RL can have an aperture through which the respective recline rod 40, 60 extends. The front and rear rails FR, RR provide an arcuate or swinging pathway for the trolley 50.

Figure 4:
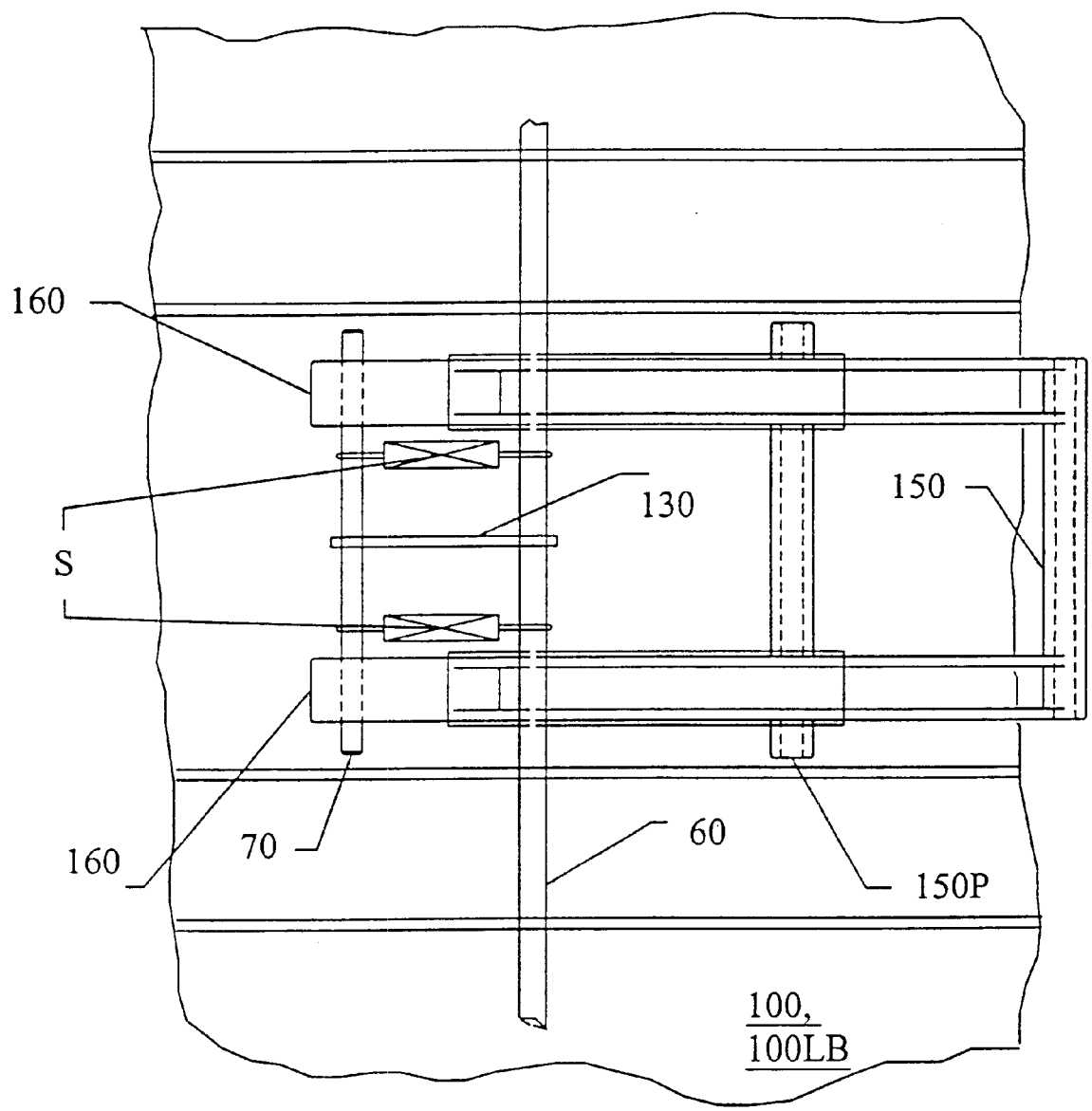
FIG. 4 schematically illustrates a linkage assembly that connects a trolley recline rod to a rear trolley rod.
Figure 11:
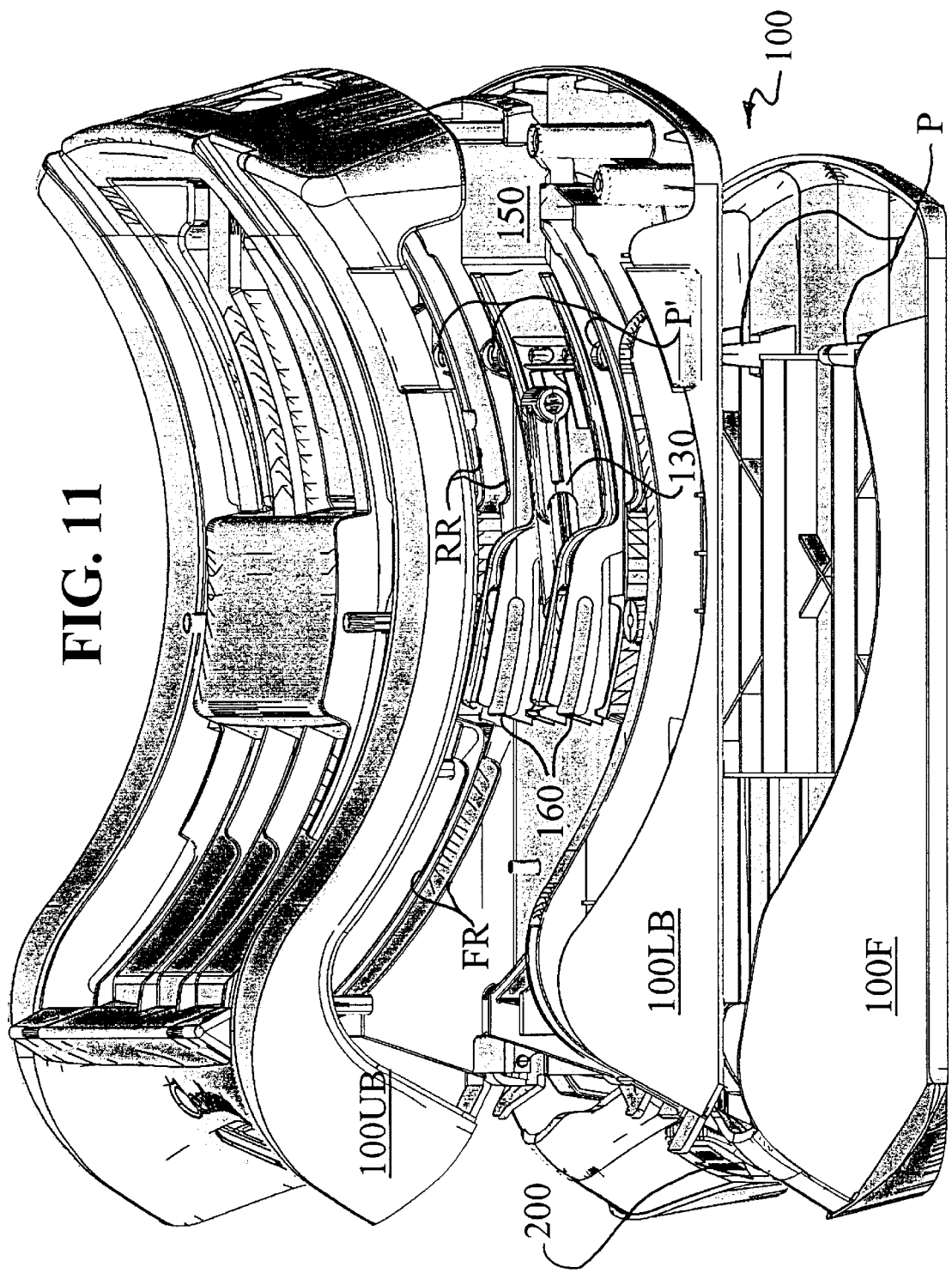
FIG. 11 is an exploded perspective view of the base, showing a foot, a lower body, and an upper body.

Referring to FIGS. 2 and 4, to adjust the trolley between the two reclined positions, the base 100 is provided with a pivotable recline actuator 150, which can have a pair of laterally spaced fork-like engaging members 160. Each engaging member 160 has a slot that engages and guides a recline adjusting rod 70. See FIGS. 4, 11, and 12. The recline rod 70 can engage one of two positioning recesses 100RFR, 100RRR formed on the base 100. In this respect, the base 100 can have walls or ribs or appendages 100R with the recesses 100RFR, 100RRR depending from its underside. The recline actuator 150 is pivotally mounted to the base 100 with a pivot pin 150P or the like. The recline actuator 150 is pivotal in the directions of the arrows 150A about the pivot pin 150P, and can be biased to pivot the engaging members 160 upwardly (or clockwise direction in FIG. 2), which would drive the recline rod to move toward the recess 100RFR, 100RRR.

The recline adjusting rod 70 is confined between the engaging members 160 and one of the two recesses 100RFR, 100RRR, which represent the two reclined positions. Pivoting the recline actuator 150 upwardly or counterclockwise in FIG. 2 lowers the recline rod 70 to clear the two positioning recesses 100RFR, 100RRR. With the recline rod 70 positioned away from the recesses 100RFR, 100RRR, the trolley 50 can be moved to the other of the reclined positions.

Figure 5:
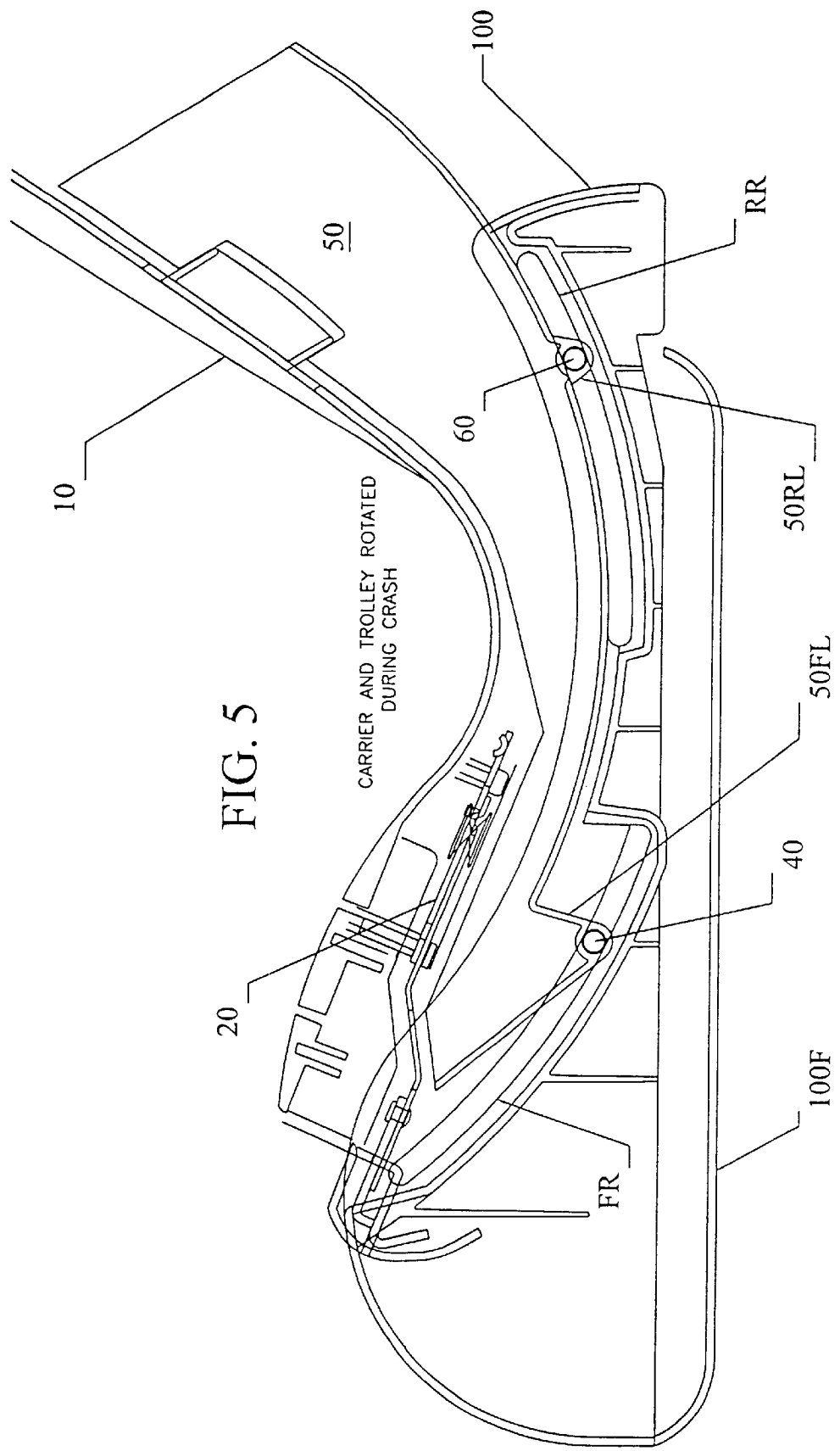
FIG. 5 is a view similar to FIG. 1, illustrating the carrier and the trolley rotated to an upright position during a collision.

Referring to FIG. 4, the recline rod 70 can be connected to the rear trolley rod 60 using a pair of laterally spaced springs S and a sacrificial or breakable or frangible link 130. The sacrificial link 130 is substantially rigid to maintain the trolley 50 in a stationary position once the recline rod 70 is positioned in one of the recesses 100FRR, 100RRR. Upon impact, such as during a frontal collision where 1 or more G-forces are directed toward the frontal direction of the vehicle, the sacrificial link 130 is adapted to break and allow the trolley 50 and the attached carrier 10 holding an infant to break away (rotate counterclockwise, referring to FIGS. 1–3) from either of the reclined positions to an upright position (FIG. 5). For example, the sacrificial link 130 can be made to break at about 1G-force or greater. As normal braking or even panic braking creates less than 1G-force, the sacrificial link 130 is designed to withstand forces generated during normal vehicle driving conditions, including panic braking.

When the sacrificial link 130 breaks, the springs S become active and keep the rear trolley rod 60 urged toward the front recline rod 70 so that the trolley 50 becomes resiliently supported to the base 100. As the trolley/carrier combination 50, 100 rotates (or breaks away) toward the upright position during a collision (FIG. 5), the springs S stretch. The springs S thus help to reduce or absorb shock by transferring the shock to a rotational movement.

FIG. 9 shows an embodiment of the sacrificial link 130 in detail. The sacrificial link 130 can be made of any suitable material, such as plastics, that breaks or snaps off when sufficient force is applied. In the embodiment shown in FIG. 9, the sacrificial link 130 comprises a first bushing 132, a second bushing 134, a first link 136, a second link 138, and a breakable member 140. The first bushing 132 can be rotatably or pivotally mounted or journalled to the front recline rod 70 by inserting the front recline rod 70 through it. The second bushing 134 can be rotatably or pivotally mounted or journalled to the rear trolley rod 60 by inserting the rod 60 through it. The sacrificial link 130 is centered between the rods 60, 70. The first link 136 comprises a pair of parallel and spaced apart linking arms, which can extend from the first bushing 132, perpendicular thereto. The second link 138 comprises a second linking arm similarly extending from the second bushing 134. The free ends of the first and second linking arms 136, 138 are connected together via the breakable member 140. The breakable member 140 is a cylindrical rod, which can extend through the first and second linking arms 136, 138. Alternatively, the cylindrical rod can be made integral with the first linking arms 136 and inserted into the second link from either side, or can be made integral with the second link 138 and inserted into the first linking arms 136. The second link 138 can have ribs 142 depending from either side thereof to strengthen the same and create a weak link at the breakable member 140. One or more of the sacrificial links 130 can be used, depending on the desired breaking point.

Studies have shown that an upright position is not comfortable for an infant. A carrier mounted at its upright position can have its seatback angled as little as 3° from the vertical. When the carrier is positioned at such an angle, an infant's head can flop forward due to its weight. This can restrict breathing, particularly with a small infant, as his or her neck muscles are not sufficiently developed to keep his or her head back and keep breathing passages completely open. Therefore, it is desirable to position an infant in a more reclined position, where the head can be better supported. Studies have shown that a reclined angle (seatback) of about 47° or greater from the vertical is more comfortable for an infant and promotes easier breathing, while reducing head and neck strain.

According to the invention, the carrier 10 can be positioned (in a rearwardly facing direction) in a more comfortable reclined position. In this respect, the trolley 50 can be adjusted relative to the base 100 so that the carrier 10 can be at a first reclined position, at about 58° (seatback) from the vertical (when the front recline rod 70 is positioned in the front recess 100RFR (FIG. 2)), and at a second reclined (less reclined) position, at about 47° (seatback), or more preferably at 49° (seatback) from the vertical (when the front recline rod 70 is positioned in the rear recess 100RRR (FIG. 3)). During an impact, when the sacrificial link 130 breaks, the carrier 10 with the trolley 50 rotates to an upright position.

The front and rear rails FR, RR can control the amount the trolley 50 can rotate relative to the base 100. According to the invention, the trolley can rotate to an upright position, when the sacrificial link 130 breaks, so that the seatback of the carrier 10 becomes upright, angled up to about 15% (i.e., greater than about 14°) from the vertical, depending upon the impact force.

Referring to FIG. 10, to promote correct installation of the base 100 to a car seat, which can vary among different cars, the base 100 can have a slot 100S for receiving a level indicator LI (shown in phantom), such as the level indicator described in U.S. Pat. No. 5,058,283, issued to Wise et al., the disclosure of which is incorporated herein by reference. The level indicator LI is designed to work with a base height adjuster (described below), which can adjust a tilt of the trolley 50, and thus the carrier 10 mounted thereto. The level indicator LI can have a colored segment or pointer that indicates whether the base 100 is correctly angled relative to the car seat.

The height adjuster is designed to tilt the base 100 relative to the car seat. In this respect, any known height adjuster can be used for this purpose. For example, U.S. Pat. No. 5,836,650, issued to Warner, Jr. et al. discloses a height adjustment mechanism for a car seat. This type of mechanism can be adapted to tilt the base 100.

Figure 6:
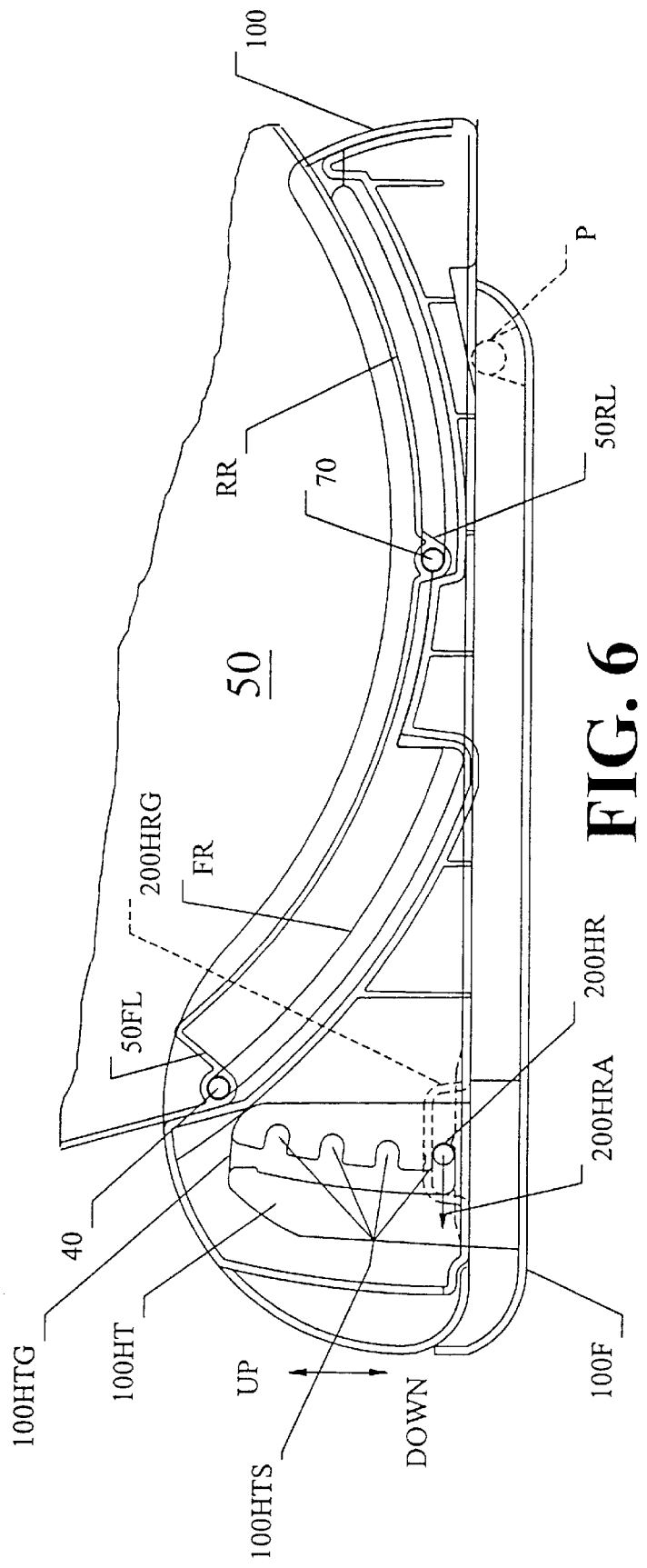
FIG. 6 is a view similar to FIG. 1, taken at a different section, revealing the trolley height adjusting mechanism.
Figure 12:
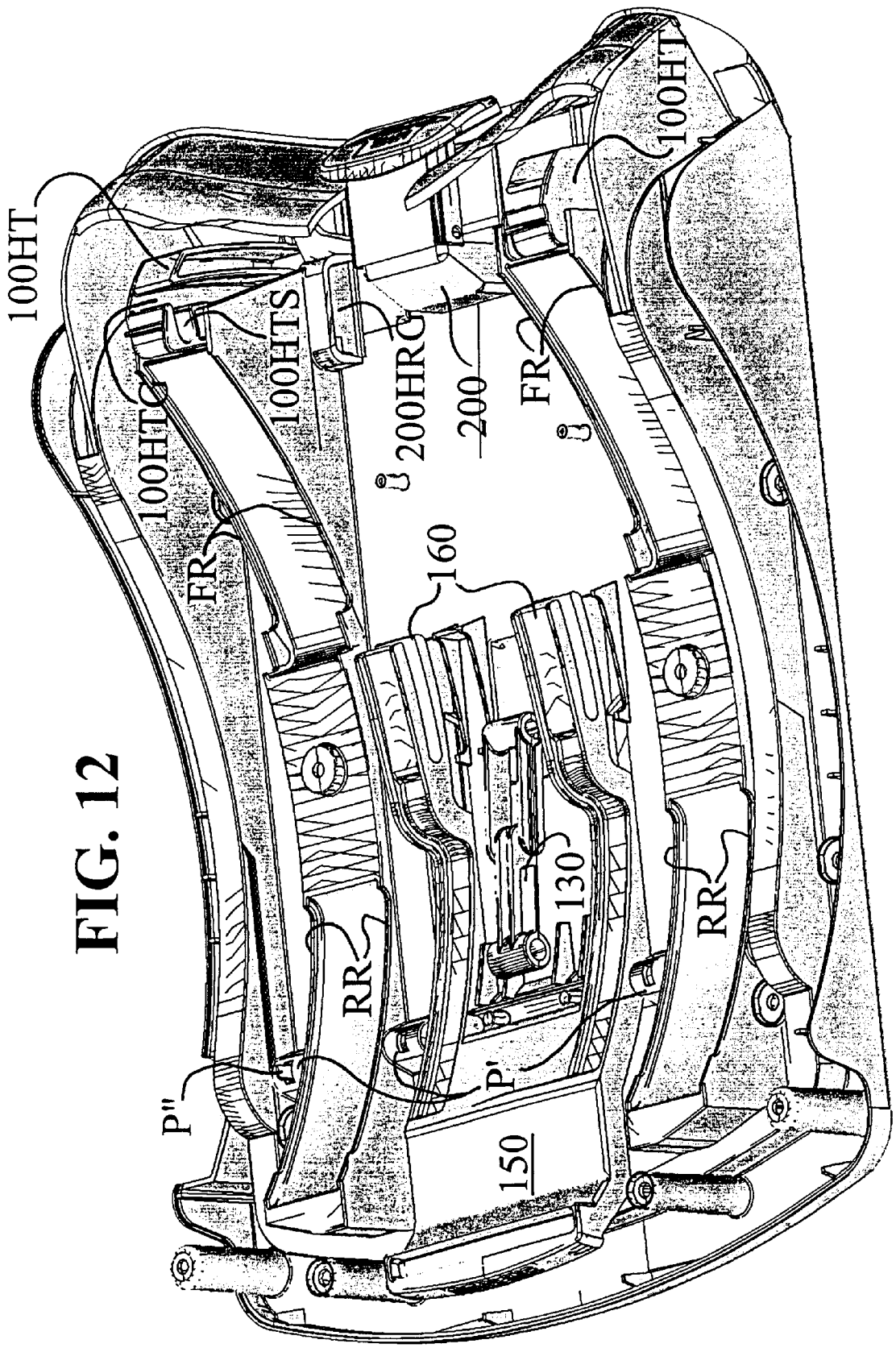
FIG. 12 is a perspective view of the base with the upper body removed.

Referring to FIGS. 2, 6, and 12, a preferred height adjuster according to the present invention comprises an actuator 200, a pair of laterally spaced apart height adjusting towers 100HT, and a height adjusting rod 200HR. In this respect, referring to FIGS. 10–12, the base 100 comprises a foot 100F and a base support 100UB, 100LB tiltably mounted to the foot 100F. One end of the base support is pivotally connected to the foot at P, P' (see FIGS. 6, 11, 12), while the opposite end thereof is adjustably movable relative to the foot 100UB to enable the base support 100UB, 100LB, which carries the trolley 50, to tilt relative to the foot 100F.

The base support can be constructed of first and second mating members, an upper base 100LB and a lower base 100LB. The front and rear trolley rails FR, RR can be formed between and by the upper and lower bases 100UB, 100LB. The lower base 100LB and the upper base 100UB can have complementary longitudinally extending ribs or walls with cutouts, forming the front and rear trolley rails FR, RR. The recline actuator 150 and the sacrificial link 130 can be positioned between the upper and lower bases 100UB, 100LB. A slot or the like (see FIG. 11) can be formed in the upper base 100UB to allow a person to reach through the upper base 100UB and actuate the recline actuator 150.

To enable tilting, the foot 100F has a plurality of aligned projections P and the lower base 100LB has a plurality of complementary sockets P' that can receive the projections P. The projections P and the sockets P' are mutually dimensioned to enable lower base 100LB to pivot thereabout. In this respect, one or more projections can include a fin P'' or the like that extends through a top end of the respective socket P', as shown in FIG. 12. The sockets P' can have a guide channel (not numbered) to guide the fin P''.

Referring to FIGS. 6 and 12, the adjusting towers 100HT can be fixedly connected to or integrally formed with the foot 100F. The height adjusting rod 200HR is vertically confined between a pair of opposing slots or channels 200HRG formed in the lower base 100LB. That is, the height adjusting rod 200HR is not vertically movable relative to the lower base 100LB, but is movable in the horizontal fore and aft direction (of the arrow 200HRA in FIG. 6). The adjusting towers 100HT have rod engaging slots 100HTS merging into a common guide channel 100HTG. The slots 100HTS of each adjusting tower 100HT are substantially vertically spaced and stacked, as shown in FIG. 6. The two adjusting towers 100HT are arranged so that the slots 100HTS and the guide channels 100HTG are aligned and face each other, i.e., a mirror image of each other.

Referring to FIG. 2, the height adjusting actuator 200 engages the height adjusting rod 200HR. Specifically, the actuator 200 has a pair of opposing slots or recesses 200R extending upwardly from its end 200F. Each recess 200R is dimensioned to receive the rod 200HR and move the rod 200HR away from the height adjusting tower slots 100HTS and enable the lower and upper base 100LB, 100UB (along with the trolley 50) to tilt relative to the foot 100F.

Referring to FIGS. 2 and 6, the height adjusting rod 200HR is positioned at the lowest slot 100HTS, at which the tilt angle between the foot 100F and the trolley 50 is at a minimum or no relative tilt. To increase the relative tilt angle, the actuator 200 is moved, e.g., pulled or pivoted, along the arrow 200HRA to move the rod 200HR in the same direction. When the rod 200HR is moved out of the slots 100HTS of the opposing height adjusting towers 100HT, the upper and lower bases 100UB, 100LB can be moved upward (relative to the foot 100F) to increase the tilt angle between the trolley 50 and the foot 100F. Although not illustrated, the adjusting rod 200 can be biasedly mounted to the lower base 100LB to bias the rod 200HR toward the slots 100HTS (i.e., opposite the arrow 200HRA). Alternatively, the actuator 200 itself can be biasedly mounted to either the lower base 100LB or upper base 100UB to urge the rod 200 toward and into the slots 100HTS.

The carrier 10 can be removably mounted to the trolley 50. This can be done using a latch mechanism disclosed in co-pending U.S. patent application Ser. No. 08/927,019, the disclosure of which is incorporated herein by reference. Any known latch mechanisms, such as disclosed in U.S. Pat. Nos. 5,772,279 and 5,385,387, also can be used to secure the carrier 10 to the trolley 50.

Figure 7:
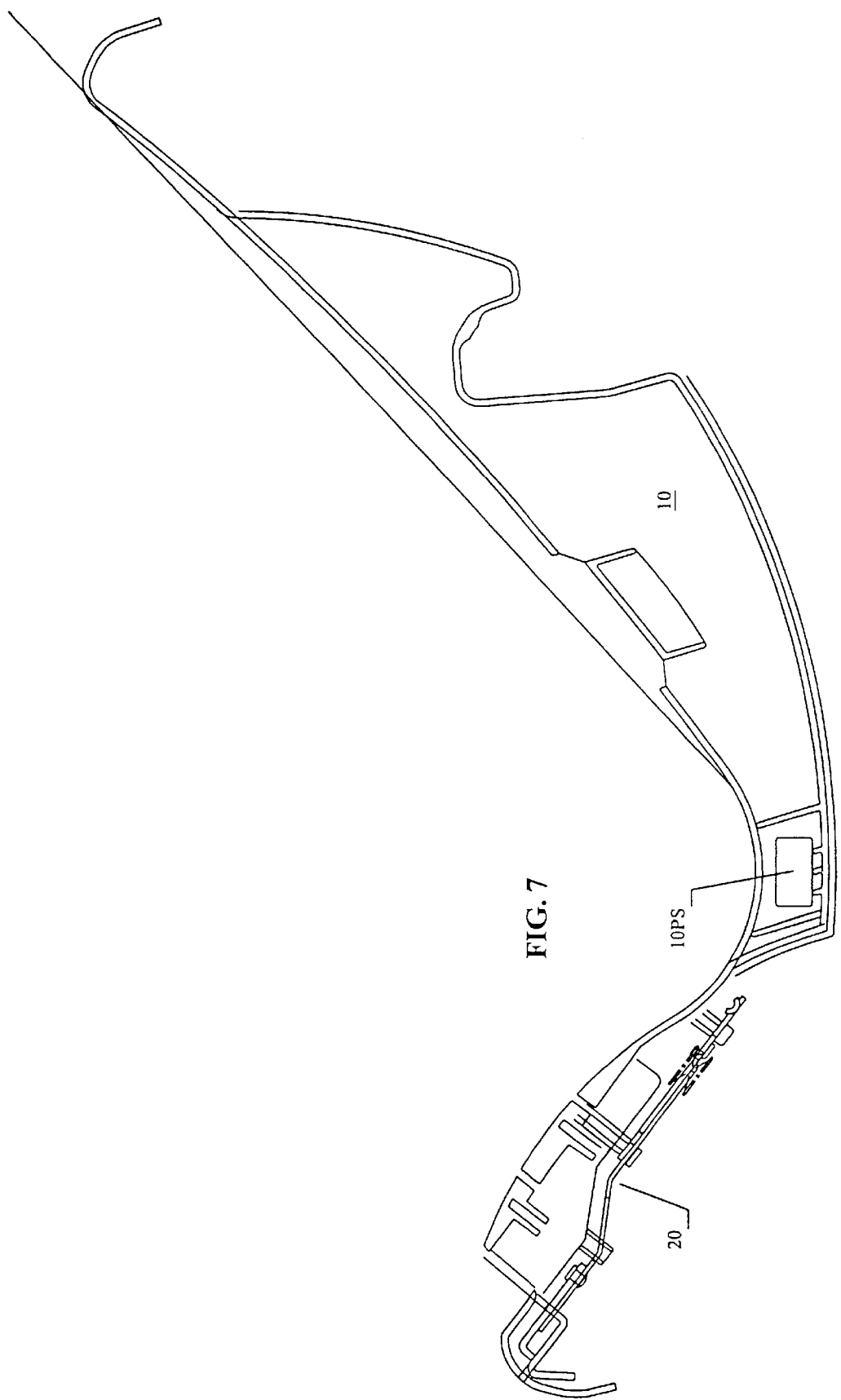
FIG. 7 is a schematic side view of the carrier.
Figure 8:
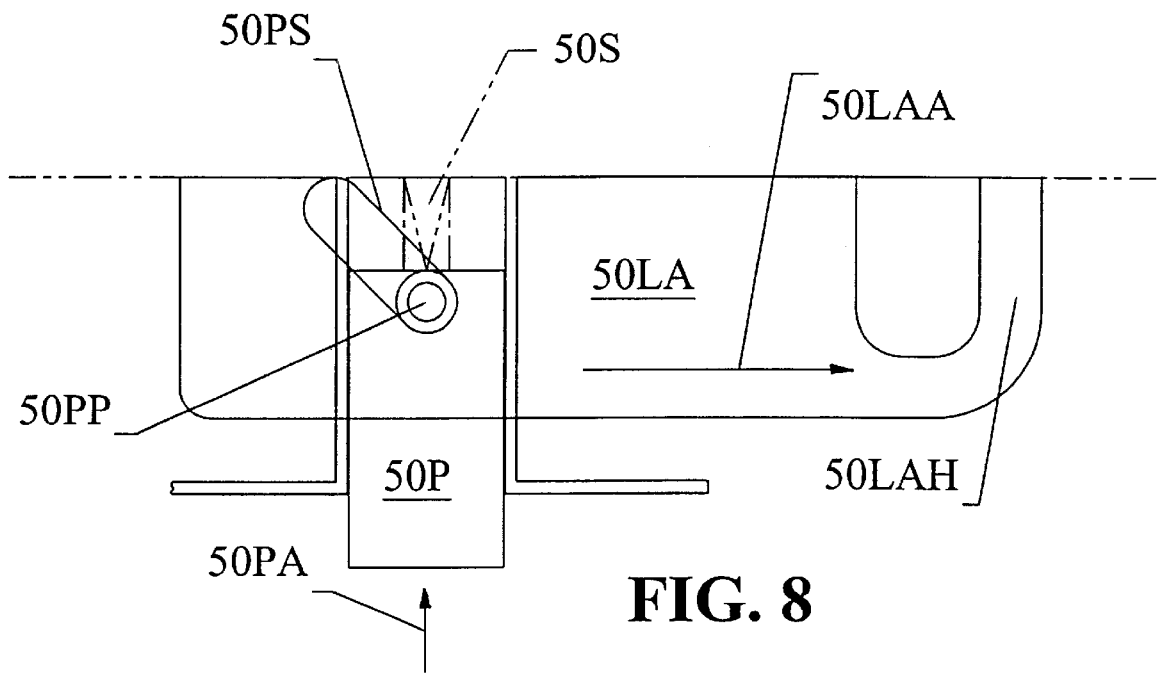
FIG. 8 is a bottom view of the trolley latch mechanism for releasing the carrier from the trolley.
Figure 8A:
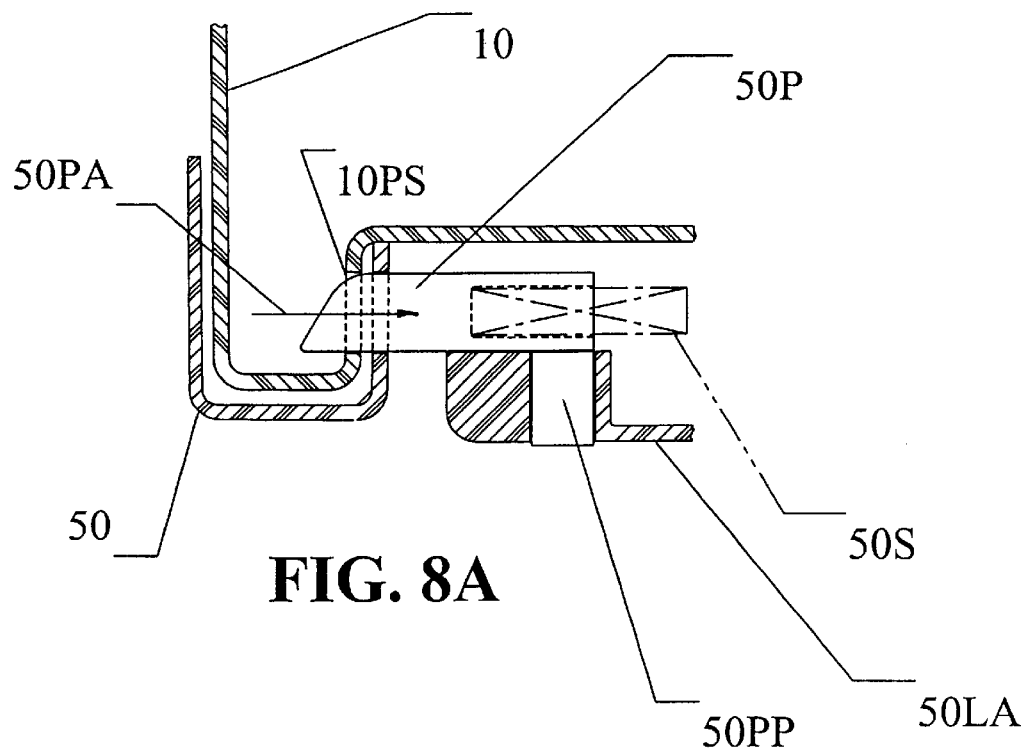
FIG. 8A is a sectional view illustrating a latch plunger in the extended position.

A preferred carrier latch mechanism is schematically illustrated in FIGS. 7, 8, and 8A. It includes a latch actuator 50LA and at least two spring-biased latch plungers 50P that extend laterally into opposing slots 10PS formed in the carrier 10. Each plunger 50P is spring biased toward the outwardly extending position as shown in FIGS. 8 and 8A. The latch actuator 50LA has a pair of (mirror imaged) diagonal slots 50PS (only one shown), each of which can extend at 45° relative to the plunger movement 50PA. The plunger 50P has a pin 50PP extending downwardly therefrom, as shown in FIG. 8A. This pin 50PP, which is guided in the slot 50PS, can be rotatably mounted to the plunger 50P or fixedly connected thereto. The slots 50PS and the pins 50PP are configured so that pulling the latch actuator 50LA in the direction of the arrow 50LAA causes the plungers 50 to move inwardly (withdraw) toward each other in the direction of arrow 50PA, against the bias of their respective springs 50S. Each spring 50S can be positioned in a recess formed in a distal end of the respective plunger 50P, as shown in FIGS. 8 and 8A.

Although not shown, each spring 50S can abut against a fixed part of the latch actuator 50LA so that the spring 50S biases the respective plunger 50P outwardly and returns the latch actuator 50LA to the position shown in FIGS. 8 and 8A. Alternatively, the latch actuator 50LA itself can be biasedly mounted to the trolley 50 (using one or more springs or elastic members) so that the latch actuator 50LA is urged inwardly to the position shown in FIGS. 8 and 8A. In that case, individual latch springs 50S can be eliminated. In another alternative embodiment, a single spring can extend collinearly between the plungers 50P to bias them outwardly. In that case, the spring can be guided along a channel or recess that extends collinearly with the plungers 50P.

The latch actuator 50LA can include a handle 50LAH for manual gripping. Pulling the handle in the direction of arrow 50LAA causes its diagonal slots 50PS to guide the pins 50PP inwardly toward each other to withdraw the plunger from the slots 10PS formed in the carrier 10 and release the same. Although pulling is preferred, the diagonal slots 50PS can be configured in the opposite direction so that pushing the latch actuator 50LA causes the pins to move toward each other and withdraw the plungers 50P from the slots 50PS.

The carrier can include a belt locking device 20 described in co-pending application Ser. No. 09/421,410, filed concurrently herewith entitled WEB ADJUSTER FOR INFANT PRODUCTS, the disclosure of which is incorporated herein by reference.

Given the disclosure of the present invention, one versed in the art will appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

We claim:

1. An infant carrier assembly comprising:
   a base adapted to be secured to a vehicle seat;
   a trolley movably mounted to the base, the trolley being limited to move between a first reclined position and a second reclined position, which is less reclined than the first reclined position;
   an infant carrier detachably mountable to the trolley in a rearwardly facing direction relative to the vehicle seat; and
   a linkage assembly connecting the trolley to the base and limiting the trolley to move between the first and second reclined positions,
   wherein the linkage assembly has a sacrificial link adapted to break when a predetermined force is applied to the trolley in a forward direction of the vehicle, and to move the trolley out of the first and second reclined position to an upright position.

2. An infant carrier assembly according to claim 1, wherein in the first reclined position, the carrier is angled about 58° from the vertical and in the second reclined position, the carrier is angled about 49° degrees from the vertical.

3. An infant carrier assembly according to claim 2, wherein the base has a front rail and a rear rail, and the trolley carries a front recline rod and a rear recline rod, the front rail receiving and guiding the front recline rod and the rear rail receiving and guiding the rear recline rod so that the trolley is movable relative to the base along the front and rear rails.

4. An infant carrier assembly according to claim 3, wherein the linkage assembly includes a recline adjusting rod latchable to the base, the sacrificial link coupling the rear recline rod, which is connected to the trolley, to the recline adjusting rod, which is latchable to the base.

5. An infant carrier assembly according to claim 4, wherein the linkage assembly further includes at least one spring coupling the recline adjusting rod to the rear recline rod, the spring being active when the sacrificial link breaks.

6. An infant carrier assembly according to claim 5, wherein the base has first and second recesses that receive the recline adjusting rod, the trolley being locked in the first reclined-position when the recline adjusting rod is seated in the first recess and locked in the second reclined position when the recline adjusting rod is seated in the second recess.

7. An infant carrier assembly according to claim 6, further including a recline actuator movably mounted to the base and having a first engaging member that engages the recline adjusting rod, the recline being adapted to move the recline adjusting rod away from one of the first and second recesses to release the trolley, upon which the trolley is movable to the other of the first and second recesses.

8. An infant carrier assembly according to claim 7, wherein the recline actuator includes a second engaging member laterally spaced apart from the first engaging member, and wherein the actuator is pivotally mounted to the base.

9. An infant carrier assembly according to claim 4, wherein the sacrificial link comprises a first member pivotally connected to the recline adjusting rod and a second member pivotally connected to the rear recline rod to the recline adjusting rod, and a breakable member connecting the first and second members.

10. An infant carrier assembly according to claim 9, wherein the first member comprises a first bushing pivotally journalled about the recline adjusting rod, and a first pair of spaced apart linking arms extending from the first bushing, and wherein the second member comprises a second bushing pivotally journalled about the rear recline rod, and a second linking arm extending from the second bushing, wherein the breakable member connects free ends of the first and second linking arms.

11. An infant carrier assembly according to claim 1, wherein the carrier is angled upright up to about 15% or 14° from the vertical when the carrier is in the upright position.

12. An infant carrier assembly according to claim 1, wherein the base includes a tilting mechanism that tilts the trolley relative to the vehicle seat.

13. An infant carrier assembly according to claim 12, wherein the base comprises a foot, a lower base, and an upper base, the lower base being tiltably connected to the foot and the upper base being fixedly attached to the lower base.

14. An infant carrier assembly according to claim 13, wherein the tilting mechanism comprises an actuator, a first height adjusting tower, and a height adjusting rod, the actuator being movably mounted to the base and engaging the height adjusting rod, the height adjusting tower being fixedly connected to the foot and having a plurality of rod receiving slots, the height adjusting rod being movably mounted to the lower base, the actuator being adapted to move the height adjusting rod out of the respective slot, which allows the lower and upper bases to tilt relative to the foot.

15. An infant carrier assembly according to claims 14, further including a second height adjusting tower spaced apart from the first height adjusting tower, the first and second height adjusting towers receiving opposite ends of the height adjusting rod.

16. An infant carrier assembly according to claim 15, wherein the actuator has a slot that receives the height adjusting rod, between the ends thereof.

17. An infant carrier assembly according to claim 1, further including a carrier latch assembly comprising a pair of opposing slots formed at the carrier, a latch actuator, and first and second spring-biased latch plungers movably mounted to the trolley and movable into the opposing slots, wherein the latch actuator is operably connected to the latch plungers to withdraw the plungers from the opposing slots to detach the carrier from the trolley.

18. An infant carrier assembly according to claim 17, wherein the latch actuator has a pair of mirror-imaged diagonal slots, and wherein each latch plungers has a pin extending therefrom and guided in one of the diagonal slots, the slots being configured to move the pins toward each other when the latch actuator is pulled.

19. A base assembly for an infant carrier comprising:
   a base adapted to be secured to a vehicle seat;
   a trolley movably mounted to the base, the trolley being limited to move between a first reclined position and a second reclined position, which is less reclined than the first reclined position, the trolley being adapted to mount an infant carrier in a rearwardly facing direction relative to the vehicle seat; and
   a linkage assembly connecting the trolley to the base and limiting the trolley to move between the first and second reclined positions,
   wherein the linkage assembly has a sacrificial link adapted to break when a predetermined force is applied to the trolley in a forward direction of the vehicle, and to move the trolley out of the first and second reclined position to a third position, which is an upright position.

20. A base assembly according to claim 19, wherein the trolley is in the first reclined position so that the carrier mounted thereto is about 58° from the vertical and in the second reclined position so that the carrier mounted thereto is about 49° degrees from the vertical.

21. A base assembly according to claim 20, wherein trolley moves to the upright position so that the carrier mounted thereto is angled upright up to about 15% or 14° from the vertical.

22. A method of controlling an infant carrier position in a vehicle, comprising:
   providing a base, which is adapted to be secured to a vehicle seat;
   mounting a trolley to the base and limiting the trolley between a first reclined position and a second reclined position, which is more upright than the first reclined position, relative to the base;
   detachably mounting an infant carrier to the trolley in a rearwardly facing direction relative to the vehicle seat;
   providing a linkage assembly, having a sacrificial link, to connect the trolley to the base; and
   breaking the sacrificial link when a predetermined force is applied to the carrier in a forward direction of the vehicle to move the trolley out of the first or second reclined position to an upright position.

* * * * *